United States Patent Office 2,766,784
Patented Oct. 16, 1956

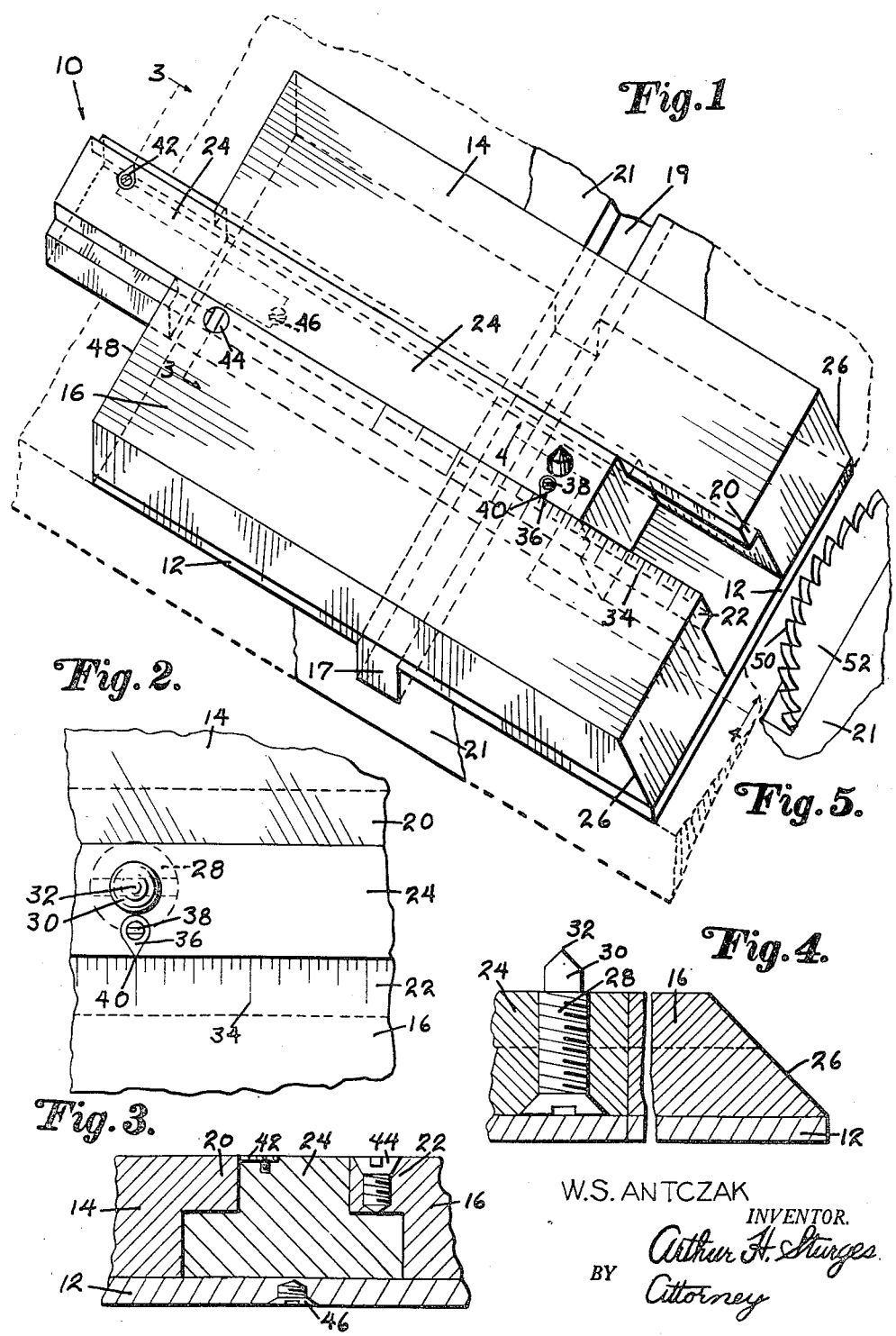

2,766,784
GUIDE DEVICE FOR USE DURING SAWING OPERATIONS

Walter S. Antczak, Grand Island, Nebr.

Application October 29, 1954, Serial No. 465,631

3 Claims. (Cl. 143—171)

The instant invention relates to the art of sawing, and more particularly to devices arranged for cutting sawn work into several different configurations in plan.

An object of the invention is to provide a device through an employment of which a cutting of work such as boards and the like may be achieved, particularly a cutting of said work into circular configurations of a selected diameter.

Another object of the invention is to provide a device through an employment of which a sawing of work into various other shapes and designs may be consummated, including square, octagonal, and similar configurations in plan.

A further object of the invention is to provide a device for facilitating a production of the above-mentioned configuration by using the new device with any preferred type of table saw, which is provided with a slot let into the upper surface thereof, said slot being disposed in parallelism with the circular saw blade of the table saw selected.

A still further object of the invention is to provide a device for the above-mentioned purposes which may be readily manipulated by an amateur as well as a skilled sawyer and with a minimum expenditure of time and labor.

Another object of the invention is to provide a device for the purpose described which may be employed in conjunction with a tiltable table top saw as well as what is known as a tilting arbor circular saw such as or similar to the sawing machine depicted on page 34 of Catalogue No. 13 published by the Delta Manufacturing Co., of Milwaukee, Wisconsin. With the last mentioned type of sawing machine the table top thereof remains stationary while the rotatable arbor which carried the circular saw is tiltable for sawing bevelled or inclined edges on dimension lumber and the like.

Other and further objects and advantages of the invention will be understood from the following detailed description thereof.

In the drawings:

Figure 1 is a perspective view of the new device showing its relative position during use with respect to the slot of a saw table top, said top being partially broken away and certain portions thereof depicted in section.

Figure 2 is a top plan view of a portion of a pivot pin support and portions of guide tracks employed, certain portions of said parts being broken away.

Figure 3 is a transverse section of portions of the parts shown in Figure 2, the view being taken substantially on line 3—3 of Figure 1 and looking in the direction of the arrows.

Figure 4 is a transverse section of a further portion of the new device, the view being taken substantially on line 4—4 of Figure 1 and showing a pivot pin employed.

Figure 5 is a top plan view of a fragment of a circular saw blade employed during operation of the new device.

It is well known that as heretofore practiced, a sawing of circles, arcs, and the like curvaceous type of work on a conventional table saw has been a difficult, time-consuming, and tedious procedure, since heretofore there has not been a provision made or device so constructed which facilitates the cutting and sawing of the aforementioned geometric configurations, and the instant invention aims to provide a device which is so constructed that the difficulties encountered in the prior practice are overcome by an employment of the new device during a making of arcuate cuts and the like in an efficient manner, irrespective of the area in plan of the work.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout and in which the numeral 10 refers to the invention in its entirety, and 12 indicates the base or main body portion of the new device. On the base 12 two oppositely disposed spaced guide tracks or rails 14 and 16, which are secured by any suitable means to a base plate 12, the latter being formed preferably of metal.

The track 14 is provided with a projecting lip portion 20 and the member 16 is similarly provided with a lip 22.

As best shown in Figure 1, said lips confront each other and are spaced apart with respect to each other for providing a channel therebetween. The channel extends the entire longitudinal length of the new device.

The new device further includes a guide lug or strip 17, which is transversely disposed with respect to the base plate 12 of the new device, being attached to said bottom by any suitable means. The transverse width of the guide strip 17 is complemental to the width of the slot 19 provided in the table top 21, said strip fitting snugly and slidably therein, being employed for purposes later described. The lug or strip 17 is disposed at a right angle to the tracks or rails 14 and 16.

Within the channel an elongated bar 24 providing a pivot pin support is slidably disposed. As best shown in Figure 3 the member 24 is T-shaped in cross section, being retained in operative position by means of the lips 20 and 22 which abut the arms of the T.

As best shown in Figure 4, one end of each of the guide tracks or rails 14 and 16 is bevelled as indicated at 26, since at times when the arbor of the saw blade or table top, as the case may be, is tilted during sawing operations for providing a bevelled edge on the work, the saw blade would otherwise cut the ends 26 of the guide tracks 14 and 16 of the new device.

As best shown in Figure 4 a screw 28 is disposed through the member 24. The screw is provided with a restricted portion 30 on its shank, and the latter terminates in a comparatively sharp point 32. The point 32 extends beyond the adjacent surface of the member 24 a suitable distance for purposes later described.

The guide track 16 has a scale 34 etched or otherwise suitably attached to its lip 22 in a manner whereby said scale is closely adjacent to an edge of the pivot pin support 24. For convenience of illustration, but a portion of said scale is depicted in Figure 1 and it will be understood that the said scale extends substantially the entire length of the lip 22, and that the lines of demarcation of the scale subdivide the distance of the scale into inches and fractions of inches for purposes later described.

Adjacent the shank 30 of the screw 28 an indicator 36 is provided which is secured to the member 24 preferably by means of a screw 38. The indicator 36 is provided with a comparatively sharp point 40 which is employed in conjunction with the scale 34 for purposes later described. The sharp point 40 of the indicator is in alignment with the sharp point 32 of the screw 30 namely aligned transversely of the device.

A similar indicator 42 is similarly attached to the member 24 adjacent to that end thereof which is opposite with respect to the first-mentioned indicator 32. The pointed portion of the indicator 42 is disposed at the opposite edge of the member 24 with respect to the indicator 32 as shown.

The new device further includes a locking screw 44 positioned as shown in Figures 1 and 3 and with respect to the guide track 16.

*Operation*

During operation and for sawing a true circular configuration from the work such as a board or the like, and assuming that the length of said board is not much greater than the diameter of the circle desired, the operator first places the guide strip 17 in the slot 19 of the table top 21. The operator then moves the member 24 so that the pointed end 40 of the indicator 36 is aligned with a selected mark of the scale 34 in a manner whereby the pointed end of the indicator 36 points to a distance on the scale which is one half of the diameter of the circle to be sawn, said one half being equivalent to the distance between the pointed end 32 of the pivot pin 30 and the side 50 of the circular saw 52 shown fragmentarily in Figure 5.

The operator then manipulates the locking screw 44 for causing the end thereof to engage with an arm of the T, as best shown in Figure 3, for maintaining the pivot pin or shank 30 stationary with respect to the carriage during use.

If desired, a further locking screw 46 may be also employed for the said purpose.

The operator then ascertains and marks the approximate center of the work, namely the board to be cut by the circular saw blade 52 of the sawing machine. The operator then places the said mark on top of the pointed end 32 of the screw 28. The operator then presses down upon the work for causing the latter to be centered about the shank 30 of the screw 28, during manual rotation of the work about the pivot pin thus provided, namely said shank 30. In the event that indurate wood, such as hickory or the like, is to be sawn, the operator, in lieu of pressing the work downward about the pivot shank 30, bores a recess in the work with a drill having a diameter which is the same as the diameter of the shank 30.

Assuming that the work is initially rectangular in plan, the operator then rapidly roughly saws off the corners of the work and before cutting the latter to a true circle.

During a forming of the work into a configuration which is circular in plan, the operator may push the carriage toward the teeth of the circular saw 52 of the said machine, and it will be noted that the guide strip 17 will maintain the base and work disposed an even distance away from the teeth of the circular saw blade 52 during use.

The operator manually rotates the work on the pivot pin 30 for causing the rotating saw blade to form the work into a circular configuration in plan. At times when the circular saw blade is disposed at a right angle with respect to the tabletop, the edge of the work will be formed at a true right angle with respect to the surface of the work. In order to form a circular configuration having a bevelled edge, either the arbor of the saw blade or the table top is caused to be tilted or canted to the desired extent and in accordance with the type of saving apparatus employed.

Among other advantages of the new device it will be noted that it is comparatively compact. Means are provided for doubling the capacity of the new device by an employment of the auxiliary indicator 42, and for the said purpose the pivot-carrying member 24 is turned end for end before locking it into position by means of the locking screw 44, whereby the auxiliary indicator 42 then performs the same function in the organization as above described concerning the indicator 36 and in a manner whereby the pivot pin or shank 30 of the screw 28 can be comparatively remotely disposed with respect to the end 48 of the track 16 for cutting circles of large diameter.

To form a configuration which is square in plan by means of the new device, the pointed end 32 of the pivot pin 30 is inserted into the work as heretofore described and in lieu of the operator rotating the work during a sawing of the latter the operator moves the new device and the work thereon against the teeth of the saw blade 52 for cutting a straight line. The operator then turns the work 90° and causes the work to engage the teeth of the saw whereby the work is provided with a square corner. The operator then moves the work a further 90° for cutting an edge on the work in parallelism with the first cut and then forms a square by a further cut and after turning the work on the pivot pin 30 for the said purpose.

To form a configuration which is octagonal in plan, the operation is the same as forming a square configuration, and with the addition that the corners of the work are cut off the square configuration for providing an octagon.

During operation it will be noted that since the slot 19 of the saw table top is disposed in parallelism with the side of the saw blade 52 that the lug 17 which is slidably disposed in said slot will guide the work carried by the new device in parallelism with said slot and saw blade during a cutting of a straight edge.

From the foregoing specification, it will become apparent that the invention disclosed will adequately accomplish the functions for which it has been designed and in an economical manner and that its simplicity, accuracy and ease of operation are such as to provide a relatively inexpensive device, considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

I claim:

1. A guide for use during a forming of a selected configuration sawn out of dimensional lumber or the like on a circular saw table top having a slot disposed in parallelism with a side of said saw comprising a base plate; spaced rails having a channel therebetween carried by said base plate; an elongated lug disposed under said base plate at a right angle with respect to said rails for slidable engagement with the walls of said slot during a sawing operation; an elongated pivot pin support bar slidably disposed in said channel between said tracks; a pivot pin carried by said support bar, said pin having a pointed end protruding exteriorly of said support bar and away from said base plate; a measuring scale secured to one of said rails, said scale being adjacent to said support bar and in approximate parallelism with the latter; an indicator secured to said support bar for cooperation with said scale; and means for locking said slidable support bar to one of said rails for maintaining said pivot pin in a selected position with respect to said lug during said operation.

2. A device as defined in claim 1 in which the indicator is provided with a pointed portion, said point being disposed toward said scale and in which said point and the axis of the pivot pin are disposed in aligned parallelism with the lug thereof.

3. In a work guide for a table saw, the combination which comprises a base plate, rails mounted in spaced relation upon the base plate providing an open channel between the rails, the confronting surfaces of said rails being parallel and having extended lips on upper surfaces thereof, the lip of one of said rails having graduations providing a scale on the upper surface thereof, a bar, T-shaped in cross section slidably mounted in said rails and positioned in the channel, a center point positioned on said bar, an indicator having a point positioned on said bar and being transversely aligned with the center point, the end surfaces of the rails at one end of the guide being beveled, a transversely disposed lug mounted on the under surface of the base plate and positioned to slide in a groove of a saw table, and a locking screw threaded in one of the rails and positioned to engage the bar for securing the bar and the center point thereon in spaced relation to a saw positioned parallel to the groove of the saw table whereby work positioned on the center point may be turned to cut, selectively, a circle or elements having flat sides.

References Cited in the file of this patent

UNITED STATES PATENTS

| | | |
|---|---|---|
| 438,029 | Strahl | Oct. 7, 1890 |
| 591,424 | Postmus | Oct. 12, 1897 |
| 1,299,367 | McMichael et al. | Apr. 1, 1919 |
| 1,956,912 | Tate et al. | May 1, 1934 |
| 2,157,310 | Ward | May 9, 1939 |
| 2,696,230 | Libby | Dec. 7, 1954 |

FOREIGN PATENTS

| | | |
|---|---|---|
| 342,792 | Great Britain | Feb. 12, 1931 |

OTHER REFERENCES

Popular Science, September 1948, pages 202 and 203.
Catalog No. 13, Delta Mfg. Co., Milwaukee, Wisconsin, page 34.